(12) United States Patent
Chann

(10) Patent No.: US 6,863,810 B2
(45) Date of Patent: Mar. 8, 2005

(54) WASTEWATER AERATION SYSTEM WITH LIFT OUT LATERAL PIPES AND DIFFUSERS

(75) Inventor: Randall C. Chann, Columbia, MO (US)

(73) Assignee: Environmental Dynamics, Inc., Columbia, MO (US)

( * ) Notice: Subject to any disclaimer, the term of this patent is extended or adjusted under 35 U.S.C. 154(b) by 151 days.

(21) Appl. No.: 10/244,494

(22) Filed: Sep. 16, 2002

(65) Prior Publication Data
US 2004/0050765 A1 Mar. 18, 2004

(51) Int. Cl.[7] .............................. C02F 1/00; C02F 3/20
(52) U.S. Cl. .................... 210/220; 210/236; 210/237; 261/124; 261/DIG. 47; 261/DIG. 70
(58) Field of Search ............................. 210/220, 221.2, 210/237, 236; 261/124, 122.1, 122.2, DIG. 47, DIG. 70

(56) References Cited

U.S. PATENT DOCUMENTS

| | | | | |
|---|---|---|---|---|
| 2,997,284 A | * | 8/1961 | Nechine | 261/122.1 |
| 3,785,629 A | * | 1/1974 | McKinney | 261/122.1 |
| 4,273,732 A | * | 6/1981 | Roediger | 261/122.1 |
| 4,563,277 A | | 1/1986 | Tharp | |
| 4,842,732 A | | 6/1989 | Tharp | |
| 4,960,546 A | | 10/1990 | Tharp | |
| 5,587,114 A | | 12/1996 | Tharp | |
| 5,788,847 A | | 8/1998 | Tharp | |
| 5,846,412 A | | 12/1998 | Tharp | |

* cited by examiner

Primary Examiner—Duane Smith
Assistant Examiner—Douglas J. Theisen
(74) Attorney, Agent, or Firm—Blackwell Sanders Peper Martin LLP

(57) ABSTRACT

A wastewater aeration system that can be pivoted upwardly to expose the treatment basin floor for removal of accumulated grit or other solids. The aeration system includes a blower and a rigid or flexible supply conduit extending into the basin to supply lateral pipes with air. The laterals normally extend horizontally along the basin floor and carry air diffusers which discharge air into the basin. A winch and cable system or other mechanism can be operated to pivot the lateral pipes and diffusers upwardly away from the basin floor so that they are out of the way of equipment used to remove grit from the floor. A vertical track may be provided along a wall of the basin to accommodate raising of the lateral pipes and diffusers out of the basin.

24 Claims, 4 Drawing Sheets

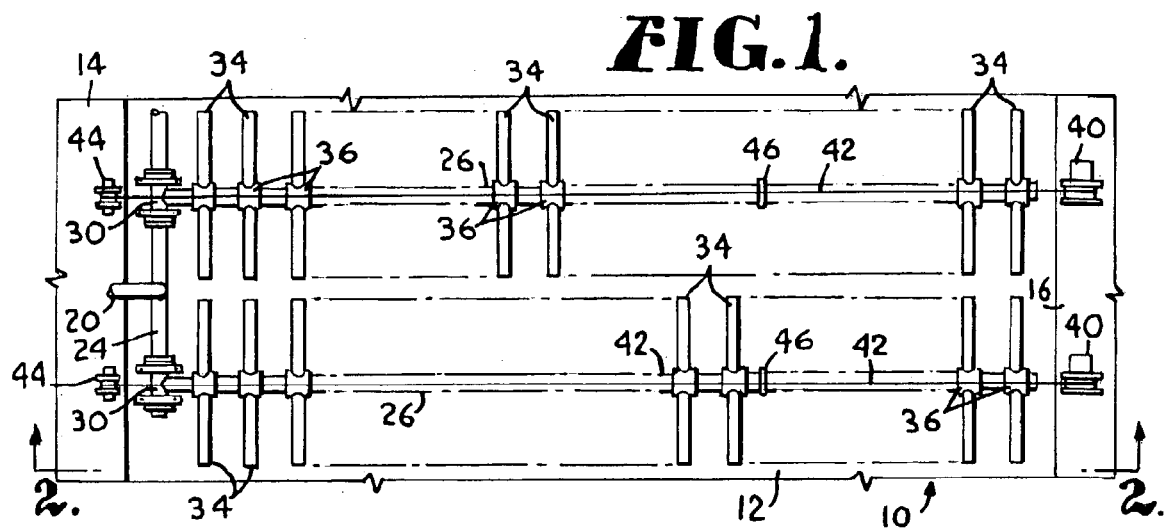
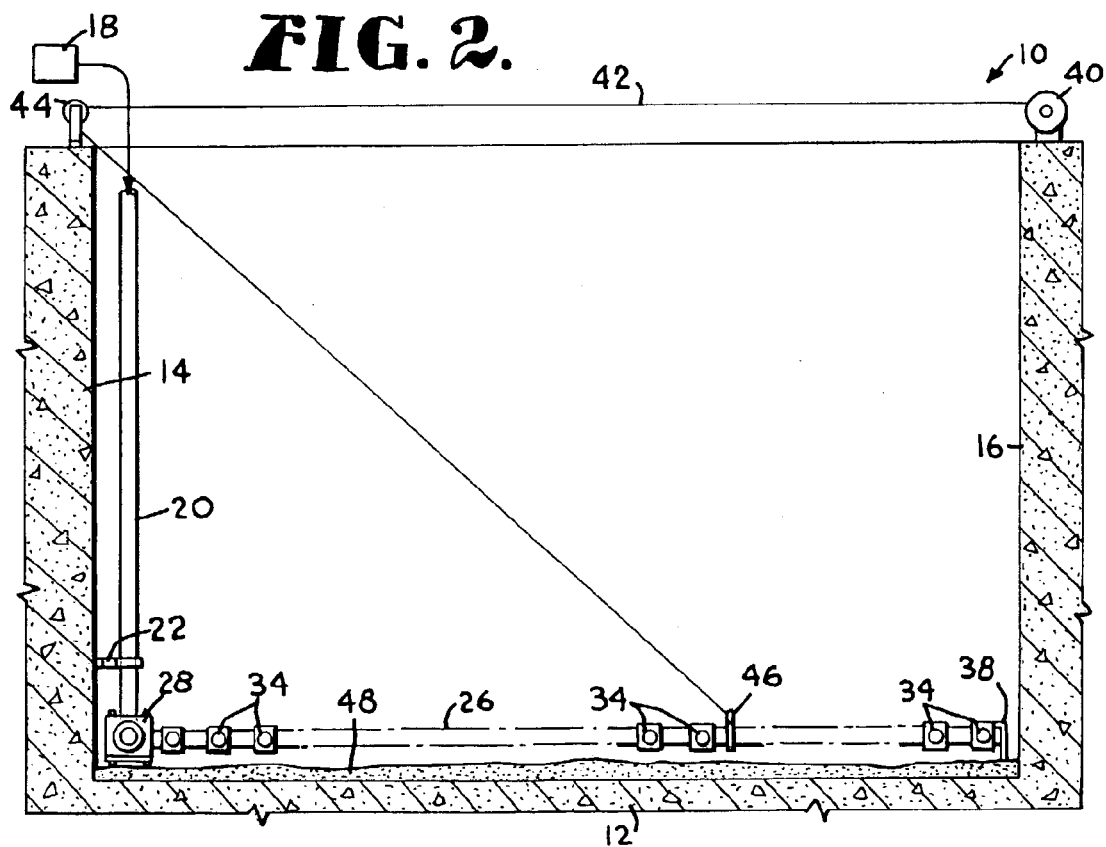

WASTEWATER AERATION SYSTEM WITH LIFT OUT LATERAL PIPES AND DIFFUSERS

FIELD OF THE INVENTION

This invention relates generally to the field of wastewater treatment and more particularly to an aeration system arranged to allow air supply laterals and diffusers carried on them to be pivotally raised from the treatment basin floor to allow full access to the basin floor for maintenance.

BACKGROUND OF THE INVENTION

In the treatment of wastewater, diffuser systems are used for aeration and mixing of the wastewater in a treatment basin. The diffuser system typically includes a blower which supplies air to one or more header pipes. In many systems, the header pipes connect with supply pipes which extend into the basin containing the wastewater. In treatment processes such as activated sludge systems making use of concrete basins, the supply pipes extend down to a location near the basin floor and connect with a lateral piping system. The lateral pipes reach into or across the basin, are anchored to the basin floor and may be equipped with air diffusers that discharge air into the basin.

In many applications, inorganic solids that enter the treatment basin are concentrated and settle as grit or other forms of solids on the basin floor. When the solids accumulation becomes excessive, it can seriously inhibit the effectiveness of the air diffusers. Consequently, it is necessary for the accumulated solids to be removed periodically in order to maintain the aeration system at peak operating efficiency. However, because of all of the piping and diffusers located in the basin and extending along its floor, it is difficult to obtain clear access to the floor so that the solids can be removed. The presence of the pipes and diffusers near the basin floor obstructs the floor area so that large machinery for removing the solids cannot be used in the basin. As a result, the maintenance expense and the downtime of the treatment system are often substantial.

SUMMARY OF THE INVENTION

The present invention is directed to an aeration system that is specially constructed to allow it to be pivoted upwardly off of the floor of a wastewater treatment basin to provide access to the floor for removal of grit and accumulated inorganic solids. In accordance with the invention, air is supplied to one or more supply pipes that extend downwardly into an aeration basin along one of its walls. The supply pipes may connect with a horizontal header pipe located near the basin floor or at a location well above the floor such as a mid-depth location. A series of lateral pipes are connected at one end with the header pipe and normally extend perpendicular to the header across the basin, along the basin floor. Each lateral is equipped with a plurality of air diffusers that may be fine bubble diffusers or coarse bubble diffusers.

The connection of each air lateral with the header pipe is a pivot connection allowing the lateral to be pivoted upwardly to a vertical position along the wall of the basin. In this manner, the laterals and diffusers can be raised off of the basin floor to expose the floor for maintenance work such as removing accumulated grit using suitable equipment. The laterals can be raised and lowered using a mechanism such as a simple winch and pulley system, or another type of arrangement if desired.

In addition to being pivoted upwardly along the basin wall, the laterals can be provided with a vertical track allowing the laterals and diffusers to be raised out of the water for maintenance. The basin floor can then be maintained without requiring de-watering of the basin.

In another configuration contemplated by the invention, the header pipe may be located well above the flow at a mid-depth position. Connecting pipes then extend from the header to the laterals. The piping system can be pivoted about the header pipe through an arc of 90° so that the laterals are vertical, or through 180° where the laterals are completely removed from the basin.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views:

FIG. 1 is a fragmentary top plan view of a wastewater treatment basin equipped with a lift out aeration system constructed according to a preferred embodiment of the present invention;

FIG. 2 is a sectional view taken generally along line 2—2 of FIG. 1 in the direction of the arrows and showing the lateral pipes and diffusers of the aeration system extending generally along the floor of the treatment basin;

DETAILED DESCRIPTION OF THE INVENTION

Figure 3:
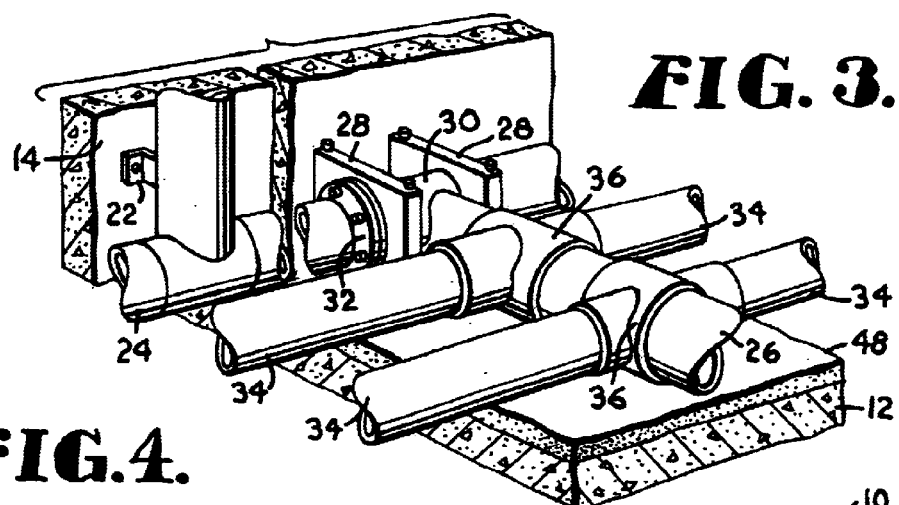
FIG. 3 is a fragmentary perspective view on an enlarged scale showing a typical pivot connection between one of the air laterals and its supply pipe, with the air lateral in a normal operating position extending generally along the basin floor.

Referring now to the drawings in more detail, and initially to FIGS. 1–5, numeral 10 generally designates a basin that is used for the treatment of wastewater. The basin 10 may be constructed of concrete. As best shown in FIG. 2, the basin 10 has a generally horizontal floor 12 and opposite side walls 14 and 16. The basin 10 also includes opposite end walls in order to confine the wastewater that is aerated and mixed in the basin.

In accordance with the present invention, an aeration system for aerating and mixing the wastewater is provided. The preferred aeration system includes a blower 18 or other source of air that delivers air under pressure to one or more air supply pipes 20 that extend downwardly into the basin 10 along one of the walls such as wall 14. Suitable brackets 22 are used to anchor the air supply pipes 20 to the wall 14. The lower end of each supply pipe 20 connects with a header pipe 24 that extends horizontally generally along the floor 12 of the basin 10 adjacent to the bottom end of wall 14. There can be a single header pipe 24 or a separate header pipe for each supply pipe or for one or more of the supply pipes.

Figure 5:
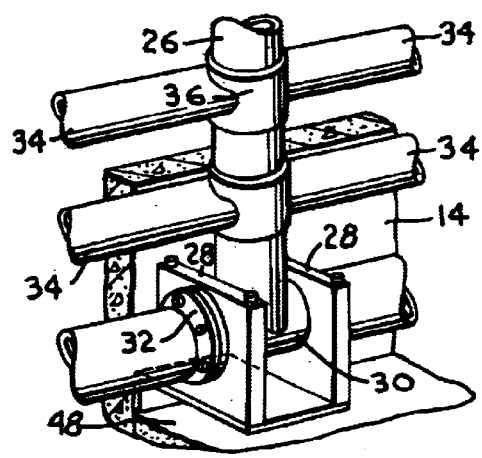
FIG. 5 is a fragmentary perspective view on an enlarged scale similar to FIG. 3, but showing the air lateral pivoted upwardly to its vertical position for exposure of the basin floor.

A plurality of air lateral pipes 26 normally extend along the floor 12 of the basin 10 and connect at one end with the header pipe 24 by means of a pivot connection. As best shown in FIGS. 3 and 5, a pair of bracket plates 28 for each lateral 26 are anchored to the floor 12 and/or to the lower portion of the wall 14. A short pipe section 30 is provided for each lateral 26 at a location between the corresponding bracket plates 28. The adjacent end of the lateral 26 rigidly connects with the pipe section 30. Each pipe section 30 is mounted for pivotal movement relative to the bracket plates 28 along a horizontal axis that is coincident with the axis of the header pipe 24. The header pipe 24 has a flanged connection at 32 with the corresponding bracket plate 28, and the pipe section 30 extends into the ends of the header pipe 24 through the flange connections 32 in a fluid tight manner while allowing the pipe section 30 to pivot through an arc of substantially 90° from the position shown in FIG. 3 to the position shown in FIG. 5. Each of the pipe sections 30 essentially forms a pivotal section of the header pipe 24.

Each lateral pipe 26 carries a plurality of spaced apart air diffusers 34 which preferably extend laterally from the opposite sides of each lateral 26 and are mounted to the lateral by means of a saddle 36. The air diffusers 34 are preferably elongated membrane diffusers that discharge air to the wastewater in the basin 10 in the form of fine bubbles. The air is supplied through the saddles 36 to the interiors of the diffusers 34 and then discharges through membranes forming part of the diffusers 34. While elongated fine bubble diffusers are preferred, other types of aerators can be used.

The end of each lateral 26 opposite the pipe section 30 is capped. As best shown in FIG. 2, this end of each lateral 26 is preferably held down adjacent to the floor 12 by a releaseable catch mechanism 38 that can be released remotely to allow the lateral pipes 26 to be pivoted upwardly. The catch mechanism 38 can be of any suitable type.

The lateral pipes 26 and air diffusers 34 are lifted away from the basin floor 12 by a winch and cable system. A winch 40 is provided for each lateral 26 and may be mounted on top of the basin wall 16 (or elsewhere) at a location aligned with the corresponding lateral 26. Each winch 40 has a winch cable 42 which is drawn around a sheave 44 mounted on top of basin wall 14. The winch cable 42 connects at its end with a bracket 46 secured to the lateral 26 at a location spaced away from the pivot axis for the lateral. The winch and cable system can be arranged differently if desired, and another type of system for raising and lowering the air laterals can be provided as an alternative.

In operation of the aeration system, air is supplied from the blower 18 to the supply pipes 20 and then to the header pipe 24 located in the basin 10. The header pipe 24 supplies air to the laterals 26 which in turn deliver the air to the diffusers 34 for discharge into the wastewater contained in the basin 10. The wastewater is thus aerated and mixed.

Inorganic materials that enter the basin 10 are concentrated and settle on the floor 12 in the form of a layer of grit or other solids 48. When the grit 48 builds up to the level of the diffusers 34, it can adversely effect the operation of the aeration system and the efficiency of the diffusers 34. Thus, the grit or other solids 48 should be removed on a periodic basis.

In order to provide access to the basin floor 12 so that suitable equipment can be used to remove the grit or other solids 48, the laterals 26 and diffusers 34 can be pivoted upwardly away from the floor 12. To accomplish this, each catch 38 is released from the corresponding lateral 26, and the winch 40 is then operated to retract the winch cable 42. This pivots the lateral 26 about the horizontal axis of header 24 from the normal operating position shown in FIG. 2 to the maintenance position shown in FIG. 4. In the operating position, the laterals extend horizontally generally along the floor 12 to locate the diffusers 34 adjacent to the floor. In the maintenance position, the laterals 26 may extend vertically upwardly from the header 24 generally along wall 14 so that the floor 12 is fully exposed. Then, with the basin dewatered, suitable equipment can be used in the basin 10 and can operate along the floor 12 to scoop or otherwise remove the accumulated grit or other solids 48.

Figure 4:
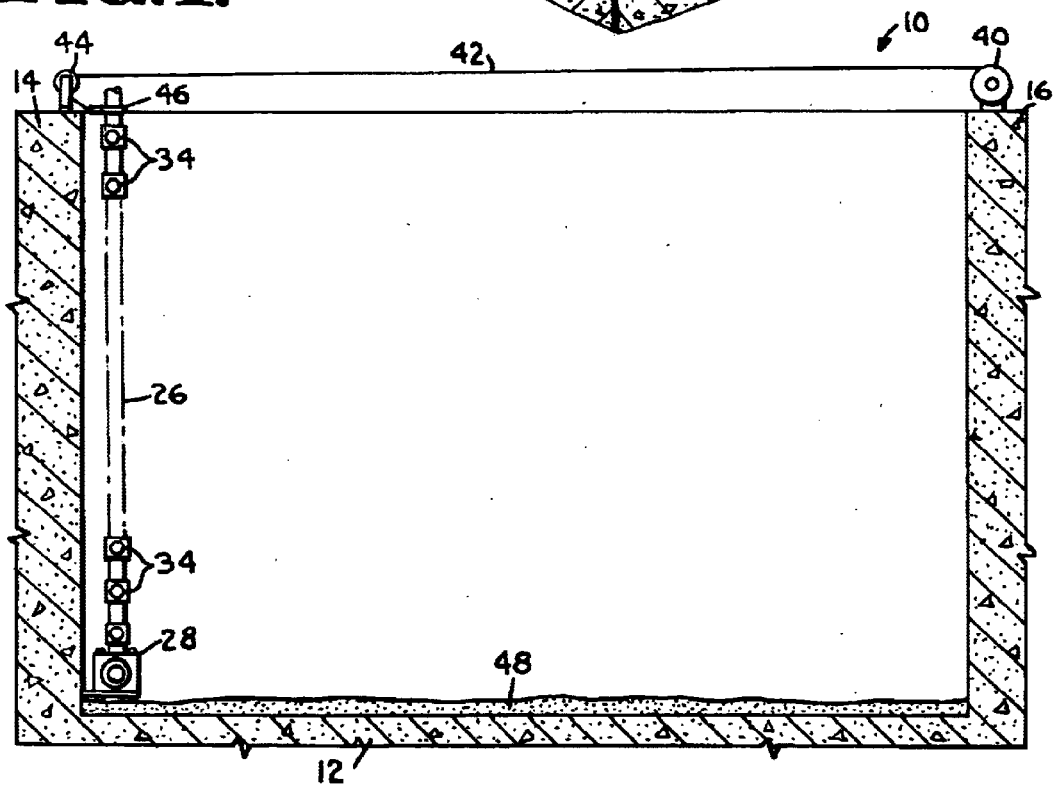
FIG. 4 is a sectional view similar to FIG. 2, but showing the laterals pivoted upwardly to their raised positions extending vertically along one of the basin walls.

After the grit has been removed and the removal equipment has been withdrawn from the basin, winch 40 can be operated in a manner to extend the winch cable 42, thereby allowing each of the laterals 26 to pivot downwardly from the maintenance position of FIG. 4 back to the operating position of FIG. 2. Once each lateral 26 has been lowered to the operating position, the catch 38 can be activated to hold the lateral down adjacent to the floor, and the basin can then receive wastewater which is aerated and mixed by subsequent operation of the aeration system.

Figure 6:
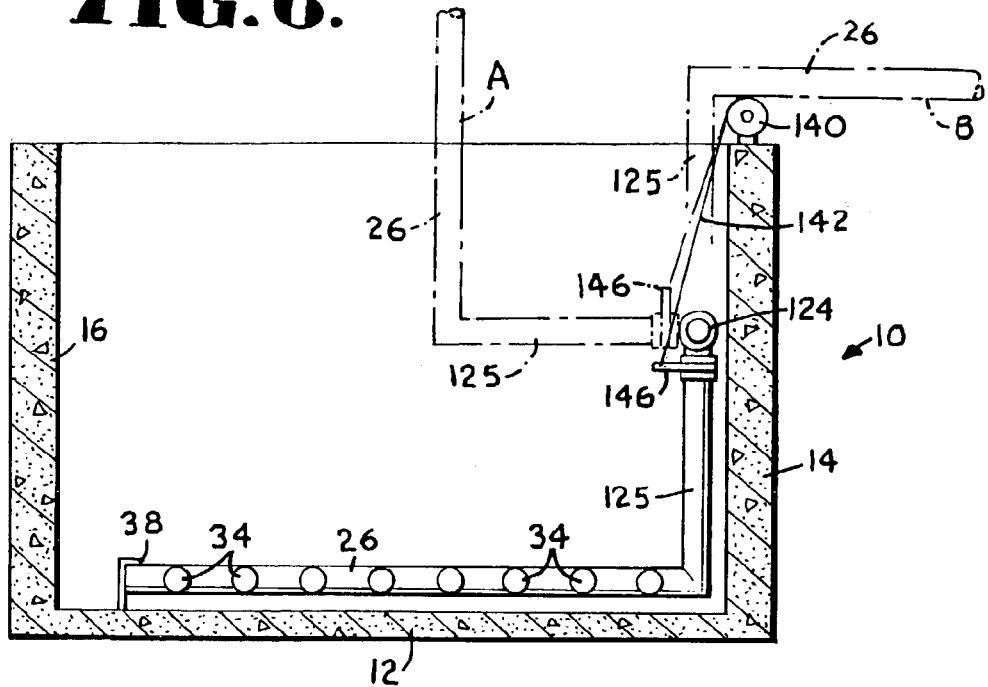
FIG. 6 is a diagrammatic side elevational view of a wastewater treatment basin equipped with a lift out aeration system constructed according to a modified embodiment of the present invention, with the broken lines showing the piping system pivoted to two different positions removing the diffusers from the basin floor.

FIG. 6 depicts an alternative embodiment of the invention which is constructed similarly to the embodiment of FIGS. 1–5 in most respects. The principal difference is that the embodiment of FIG. 6 has a header pipe 124 located well above the basin floor 12 at approximately a mid-depth location in the basin 10. The mid-depth header pipe 124 connects with the laterals 26 by means of a plurality of transfer pipes 125 which connect with the header pipe 124 at one end and with the laterals 26 at the other end. When the laterals 26 are in their operating position shown in solid lines in FIG. 6, the transfer pipes 125 are oriented vertically and extend downwardly generally along the sidewall 14 from the header pipe to the lateral pipes.

A winch 140 may be mounted on top of wall 14 and may have a winch cable 142 connected with a flange 146 mounted near the upper end of the transfer pipes 125.

In operation of the system shown in FIG. 6, air is supplied from the blower (not shown) to supply pipes (also not shown) which deliver air to the header pipe 124 in substantially the same manner described previously. The air is then supplied through the transfer pipes 125 to the air laterals 26 and is discharged into the basin by the diffusers 34. The wastewater is aerated and mixed in this manner substantially as previously described.

In order to remove the laterals 26 and diffusers 34 from the basin floor 12, the catch mechanism 38 may be released and the winch 140 may be operated to wind in the winch cable 142. The winch then pivots the transfer pipes 125 and air laterals 26 together about a horizontal pivot axis that is coincident with the center of the header pipe 124. As the transfer pipes 125 and laterals 26 are pivoted upwardly about the axis of the header pipe 124, the components reach the intermediate positions indicated at A in FIG. 6. In this position, the transfer pipes 125 extend horizontally from the header pipe 124 and the laterals 26 extend vertically and are off of the basin floor 12 so that maintenance operations can be performed on the floor. The intermediate position A is thus one position at which maintenance can be performed.

The winch cable 142 can be retracted further by the winch 140 in order to additionally pivot the transfer pipes 125 and laterals 26 to the maintenance position indicated at B in FIG. 6. In this position, the transfer pipes 125 are oriented vertically and extend upwardly from the header pipe 124, and the air laterals 26 are completely removed from the basin and extend horizontally at a location above the basin where the diffusers are accessible for maintenance work if necessary or desirable.

Maintenance work can be carried out without the need to de-water the basin. The transfer pipes 125 and laterals 26 can be pivoted back downwardly to the operating position after the maintenance work has been completed, and the catch mechanism 38 can be applied to hold the pipe assembly in place.

Figure 7:
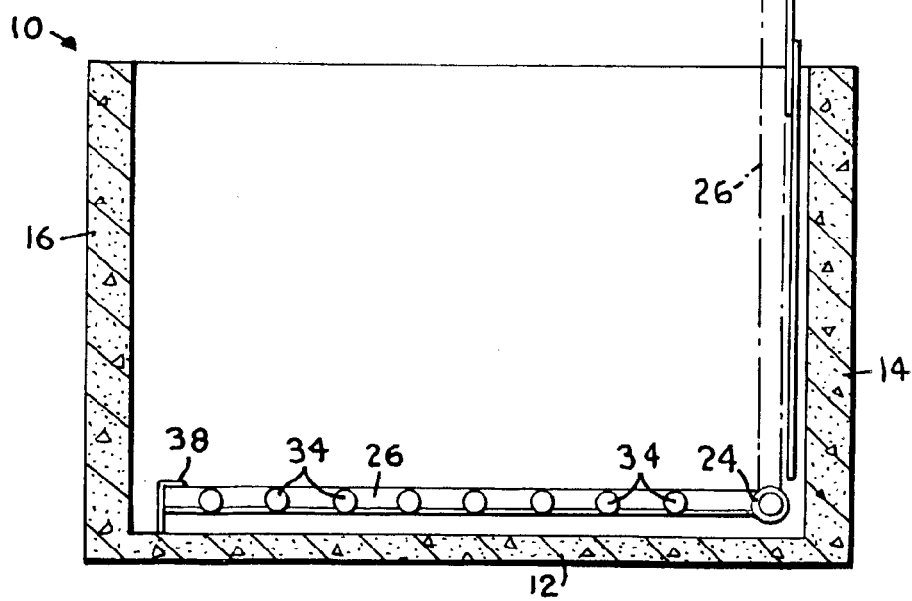
FIG. 7 is a diagrammatic side elevational view of a wastewater treatment basin equipped with a modified lift out aeration system in which a vertical track is provided on the basin wall for raising of the air laterals and diffusers after they have been pivoted to a vertical orientation.

FIG. 7 depicts another embodiment of the invention which is similar to the embodiment shown in FIGS. 1–5. The principal difference is that the embodiment of FIG. 7 includes a vertical track 160 which is installed along the wall 14 and may extend upwardly well above the top of the wall 14. When the laterals 26 are pivoted upwardly to the position shown in broken lines in FIG. 7, a bracket 162 may be applied in order to releaseably lock the laterals in the vertical position to the track 160. The header pipe 24 and laterals 26 may then be lifted upwardly out of the basin out of the track 160 by suitable equipment (not shown) in order to remove the pipe assembly from the basin and allow maintenance work to be performed on the basin floor as well as the pipe system without the need to de-water the basin. In the arrangement of FIG. 7, flexible tubing can be used as the supply pipes in order to allow the pipe assembly to be lifted out of the basin along the track 160.

After the maintenance work has been completed, the pipe assembly can be lowered along the track 160 into the basin, and the laterals 26 can be pivoted downwardly to their operating position and latched in place by the catch mechanism 38 so that the aeration system can be operated in the normal fashion.

Figure 8:
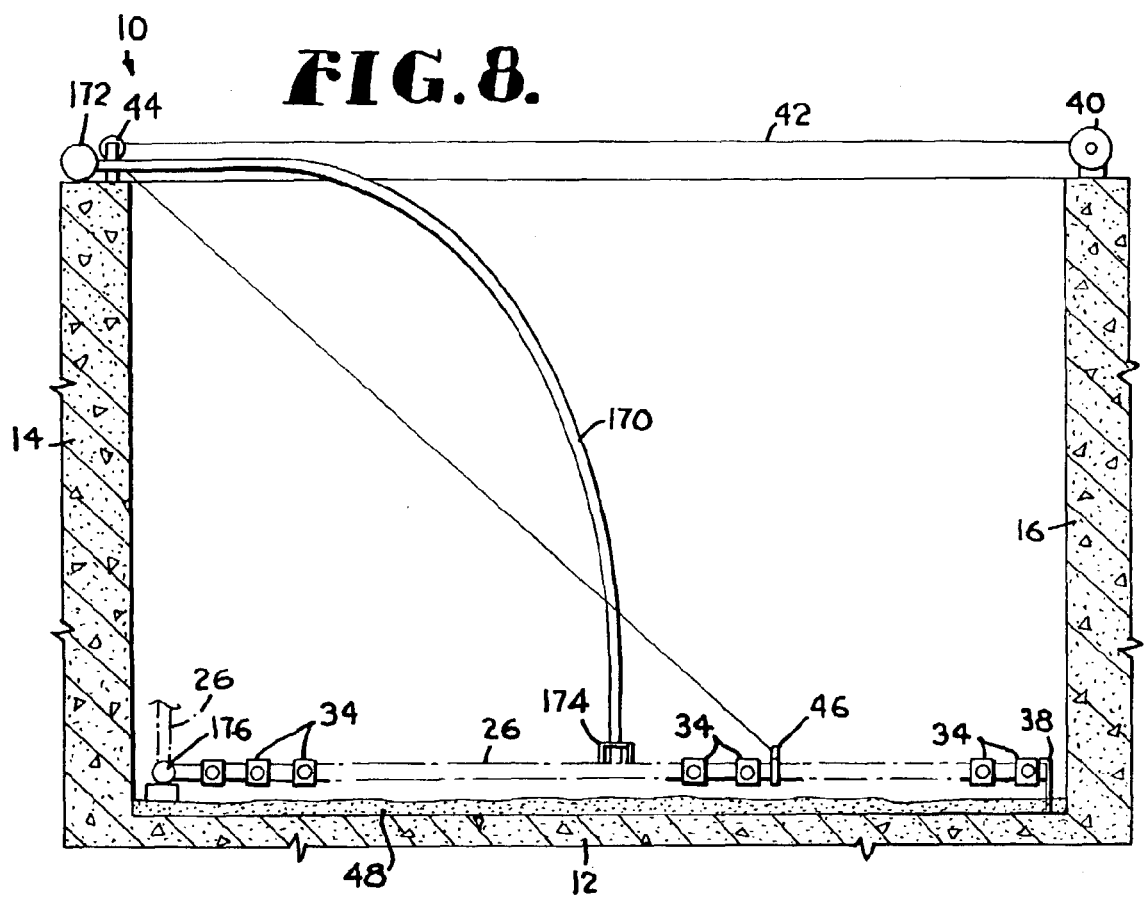
FIG. 8 is a diagrammatic side elevational view of a wastewater treatment basin equipped with still another embodiment of the invention in which a flexible hose supplies each air lateral to allow the laterals to be swung upwardly about a simple pivot connection to expose the basin floor for maintenance work.

FIG. 8 depicts yet another alternative embodiment of the invention which is similar in large part to the embodiment shown in FIGS. 1–5. The principal difference is that the embodiment of FIG. 8 includes, as the supply pipe for each lateral 26, a flexible hose 170. An air supply header 172 which may extend along the top of wall 14 receives air from a fan or blower (now shown). The upper end of each hose 170 connects with the supply header 172 to receive air from the header. The opposite or lower end of each hose 170 connects with the air lateral 26 near the center of the lateral by means of an adapter fitting 174. A simple pivot connection 176 mounted adjacent to the floor 12 of the basin near wall 14 is anchored to the floor 12 and connects with one end of each lateral 26. The pivot connection 176 allows each lateral 26 to pivot between a horizontal position extending generally along the floor of the basin and a vertical position extending generally along wall 14 (as shown fragmentarily in broken lines in FIG. 8). In normal operation of the aeration system, air is supplied from the header pipe 172 through the flexible hoses 170 to the air laterals 26. The laterals 26 in turn supply air to the diffusers 34 which discharged the air to the liquid in the basin in the form of bubbles.

The laterals 26 can be pivoted to the vertical maintenance position shown in broken lines in FIG. 8 by activating the winch 40 to retract the winch line 42. This causes the laterals 26 to pivot upwardly and eventually reach the vertical position. The flexibility of the supply hoses 170 allows the laterals 26 to be pivoted upwardly and downwardly about the pivot connection 176. Accordingly, the laterals can be pivoted upwardly to the maintenance position to provide access to the floor 12 for maintenance work without the need to de-water the basin.

After the maintenance work has been completed, the laterals 26 can be pivoted downwardly to their normal operating position and latched in place by the catch mechanism 38. The aeration system can then be operated in the normal fashion.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, what is claimed is:

1. An aeration system for aerating liquid contained in a basin having a floor, said aeration system comprising:

a plurality of lateral pipes each having one end portion connected with an air supply, each lateral pipe being pivotal at said one end portion about a generally horizontal axis between an operating position wherein each lateral pipe extends generally along the basin floor and a maintenance position wherein each lateral pipe extends generally upwardly from said axis; and a plurality of diffusers mounted on each lateral pipe to receive air therefrom and discharge the air in the operating position of each lateral pipe, whereby the lateral pipes and diffusers can be displaced from the floor area to expose the floor in the maintenance position of each lateral pipe.

2. An aeration system as set forth in claim 1, including a releaseable catch operable on each lateral pipe to hold each lateral pipe in the operating position and releaseable to allow each lateral pipe to pivot to the maintenance position.

3. An aeration system as set forth in claim 2, wherein each catch is operable on an end portion of a corresponding lateral pipe opposite said one end thereof.

4. An aeration system as set forth in claim 1, including a generally vertical track in the basin along which said lateral pipes can be raised out of the basin in the maintenance position.

5. An aeration system as set forth in claim 1, including a power operated mechanism operable to raise each lateral pipe from the operating position to the maintenance position.

6. An aeration system as set forth in claim 5, wherein said power operated mechanism comprises:

a cable connected with each lateral pipe at a location offset from said one end thereof; and a winch for retracting said cable in a manner to pivotally raise each lateral pipe from the operating position to the maintenance position.

7. An aeration system as set forth in claim 1, including a header pipe which receives air and extends generally along the basin floor along said axis, said header pipe connecting with said one end of each lateral pipe in a manner allowing each lateral pipe to pivot between the operating position and the maintenance position.

8. An aeration system as set forth in claim 7, including a pipe section in said header pipe to which each lateral pipe is rigidly connected at said one end, each of said pipe sections being rotatable about said axis relative to the rest of the header pipe to accommodate pivotal movement of each lateral pipe between the operating position and the maintenance position.

9. An aeration system as set forth in claim 1, including:

a header pipe which receives air from said air supply and extends in the basin at a location spaced above the basin floor, said header pipe being oriented generally horizontal coincident with said generally horizontal axis; and a plurality of transfer pipes extending from said header pipe to said lateral pipes to transfer air therebetween, said transfer pipes pivoting with said lateral pipes between said operating and maintenance positions.

10. An aeration system as set forth in claim 9, wherein said lateral pipes are pivotal about said axis to a second maintenance position wherein the lateral pipes extend generally horizontally above the basin and said lateral pipes and diffusers are removed from the basin.

11. A wastewater treatment system for aerating wastewater in a basin having a floor, comprising:

an air supply operable to provide a supply of air;

a supply pipe receiving air from said air supply and extending into the basin;

a plurality of lateral pipes each connected with said supply pipe to receive air therefrom and each pivotal about a substantially horizontal pivot axis between an operating position wherein said lateral pipes extend generally along the floor and a maintenance position wherein said lateral pipes are raised substantially off of the floor;

a plurality of diffusers on each lateral pipe receiving air therefrom and discharging air into the basin in the operating position of the lateral pipe;

means for pivoting each lateral pipe between the operating and maintenance positions;

a header pipe connected with said supply pipe to receive air therefrom, said header pipe extending generally horizontally in the basin at a location spaced above the basin floor coincident with said generally horizontal axis; and a plurality of transfer pipes extending from said header pipe to said lateral pipes to transfer air therebetween, said transfer pipes extending generally vertically above said header pipe and said lateral pipes extending generally horizontally at a location above the basin in said maintenance position.

12. A wastewater treatment system as set forth in claim 1, wherein said lateral pipes extend generally upwardly from said axis in said maintenance position and including a generally vertical track in the basin along which said lateral pipes can be raised out of the basin in the maintenance position.

13. In a wastewater treatment system for aerating wastewater in a basin in which diffusers discharge air into the wastewater and receive air from a plurality of lateral pipes on which the diffusers are mounted and in which a header pipe extends in the basin for receiving air and directing air to each lateral pipe, the improvement comprising:

a pivot connection for each lateral pipe allowing each lateral pipe to pivot about a substantially horizontal axis between an operating position wherein the lateral pipe extends generally along a floor of the basin and a maintenance position wherein the lateral pipe and the diffusers thereon are substantially removed from the floor area to leave the floor exposed, said pivot connection for each lateral pipe including a pipe section in said header pipe to which one end of each lateral pipe connects, each pipe section being rotatable about said axis to accommodate movement of each lateral pipe between the operating position and the maintenance position; and a power mechanism operable to pivot each lateral pipe between the operating and maintenance positions.

14. The improvement of claim 13, wherein said power mechanism comprises:

a cable connected with each lateral pipe at a location offset from said pivot axis; and a winch for retracting said cable in a manner to pivotally raise each lateral pipe from the operating position to the maintenance position.

15. The improvement of claim 13, wherein:

the wastewater treatment system includes a plurality of transfer pipes extending from said header pipe to said lateral pipes and pivoting with said lateral pipes about said axis.

16. The improvement of claim 15, wherein:

said lateral pipes and transfer pipes are pivotal through an arc of approximately 180° between said operating and maintenance positions;

said transfer pipes extend generally downwardly from said header pipe in said operating position and generally upwardly from said header pipe in said maintenance position; and said lateral pipes extend generally horizontally at a location above the basin in said maintenance position.

17. The improvement of claim 16, wherein:

said lateral pipes and transfer pipes are pivotal about said axis to an intermediate position between said operating and maintenance positions;

said transfer pipes extend generally horizontally from said header pipe in said intermediate position; and said lateral pipes extend generally upwardly from said transfer pipes in said intermediate position.

18. The improvement of claim 13, wherein said lateral pipes extend generally upwardly from said axis in said maintenance position and including a generally vertical track in the basin along which said lateral pipes can be raised out of the basin in the maintenance position.

19. A wastewater treatment system for aerating wastewater in a basin having a floor, comprising:

an air supply operable to provide a supply of air;

a supply pipe receiving air from said air supply and extending into the basin;

a plurality of lateral pipes each connected with said supply pipe to receive air therefrom and each pivotal about a substantially horizontal pivot axis between an operating position wherein said lateral pipes extend generally along the floor and a maintenance position wherein said lateral pipes are raised substantially off of the floor and extend generally upwardly from said axis;

a generally vertical track in the basin along which said lateral pipes can be raised out of the basin in the maintenance position;

a plurality of diffusers on each lateral pipe receiving air therefrom and discharging air into the basin in the operating position of the lateral pipe; and means for pivoting each lateral pipe between the operating and maintenance positions.

20. A wastewater treatment system for aerating wastewater in a basin having a floor, comprising:

an air supply operable to provide a supply of air;

a supply pipe receiving air from said air supply and extending into the basin;

a plurality of lateral pipes each connected with said supply pipe to receive air therefrom and each pivotal about a substantially horizontal pivot axis between an operating position wherein said lateral pipes extend generally along the floor and a maintenance position wherein said lateral pipes are raised substantially off of the floor, said supply pipe comprising a flexible hose connected with each lateral pipe, each hose being coupled with said air supply to receive air therefrom;

a plurality of diffusers on each lateral pipe receiving air therefrom and discharging air into the basin in the operating position of the lateral pipe; and means for pivoting each lateral pipe between the operating and maintenance positions.

21. A wastewater treatment system for aerating wastewater in a basin having a floor and a wall, comprising:

an air supply operable to provide a supply of air;

a supply pipe receiving air from said air supply and extending into the basin;

a plurality of lateral pipes each connected with said supply pipe to receive air therefrom and each pivotal about a substantially horizontal pivot axis between an operating position wherein said lateral pipes extend generally along the floor away from said wall and a maintenance position wherein said lateral pipes are raised substantially off of the floor, each pivot axis being substantially perpendicular to said lateral pipes;

a plurality of diffusers on each lateral pipe receiving air therefrom and discharging air into the basin in the operating position of the lateral pipe; and means for pivoting each lateral pipe between the operating and maintenance positions.

22. In a wastewater treatment system for aerating wastewater in a basin in which diffusers discharge air into the wastewater and receive air from a plurality of lateral pipes on which the diffusers are mounted, the improvement comprising:

a pivot connection for each lateral pipe allowing each lateral pipe to pivot about a substantially horizontal axis between an operating position wherein the lateral pipe extends generally along a floor of the basin and a maintenance position wherein the lateral pipe and the diffusers thereon are substantially removed from the floor area to leave the floor exposed;

a header pipe for supplying air to said lateral pipes and extending in the basin at a location above the floor substantially coincident with said generally horizontal axis;

a plurality of transfer pipes extending from said header pipe to said lateral pipes and pivoting with said lateral pipes about said axis; and a power mechanism operable to pivot each lateral pipe between the operating and maintenance positions.

23. In a wastewater treatment system for aerating wastewater in a basin in which diffusers discharge air into the wastewater and receive air from a plurality of lateral pipes on which the diffusers are mounted, the improvement comprising:

a pivot connection for each lateral pipe allowing each lateral pipe to pivot about a substantially horizontal axis between an operating position wherein the lateral pipe extends generally along a floor of the basin and a maintenance position wherein the lateral pipe and the diffusers thereon are substantially removed from the floor area to leave the floor exposed with said lateral pipes extending generally upwardly from said axis;

a generally vertical track in the basin along which said lateral pipes can be raised Out of the basin in the maintenance position; and a power mechanism operable to pivot each lateral pipe between the operating and maintenance positions.

24. In a wastewater treatment system for aerating wastewater in a basin in which diffusers discharge air into the wastewater and receive air from a plurality of lateral pipes on which the diffusers are mounted, the improvement comprising:

a pivot connection for each lateral pipe allowing each lateral pipe to pivot about a substantially horizontal axis between an operating position wherein the lateral pipe extends generally along a floor of the basin and a maintenance position wherein the lateral pipe and the diffusers thereon are substantially removed from the floor area to leave the floor exposed, said horizontal axis being substantially perpendicular to said lateral pipes; and a power mechanism operable to pivot each lateral pipe between the operating and maintenance positions.

* * * * *